(12) United States Patent
Gordon et al.

(10) Patent No.: US 9,292,650 B2
(45) Date of Patent: Mar. 22, 2016

(54) IDENTIFYING LAYOUT PATTERN CANDIDATES

(71) Applicant: Synopsys Inc., Mountain View, CA (US)

(72) Inventors: Brian S. Gordon, San Jose, CA (US);
Rafik Marutyan, Pleasanton, CA (US);
John Kim, Santa Clara, CA (US);
Christophe P. Suzor, Mimet (FR)

(73) Assignee: Synopsys Inc., Mountain View, CA (US)

( * ) Notice: Subject to any disclaimer, the term of this patent is extended or adjusted under 35 U.S.C. 154(b) by 0 days.

(21) Appl. No.: 14/178,843

(22) Filed: Feb. 12, 2014

(65) Prior Publication Data

US 2015/0227670 A1    Aug. 13, 2015

(51) Int. Cl.
*G06F 15/04*   (2006.01)
*G06F 17/50*   (2006.01)

(52) U.S. Cl.
CPC ........ *G06F 17/5081* (2013.01); *G06F 2217/06* (2013.01); *G06F 2217/68* (2013.01)

(58) Field of Classification Search
USPC ........................................................ 716/139
See application file for complete search history.

(56) References Cited

U.S. PATENT DOCUMENTS

| 2005/0044513 A1* | 2/2005 | Robles et al. ..................... 716/4 |
| 2008/0120585 A1* | 5/2008 | Nozuyama et al. ............... 716/6 |

* cited by examiner

*Primary Examiner* — Paul Dinh
*Assistant Examiner* — Bryce Aisaka
(74) *Attorney, Agent, or Firm* — Paul S. Drake; Craig Shinners

(57) ABSTRACT

A method, system or computer usable program product for automatically identifying layout pattern candidates in selected regions for use in analyzing semiconductor device performance issues including identifying a set of target regions and a set of reference regions from a design layout; utilizing a processor to generate a reference baseline of layout patterns from the set of reference regions; utilizing the processor to compare a frequency profile of layout patterns in the set of target regions to a frequency profile of layout patterns in the reference baseline; and based on the comparison, utilizing the processor to identify candidate layout patterns from the set of target regions for further analysis.

26 Claims, 9 Drawing Sheets

FIG. 6
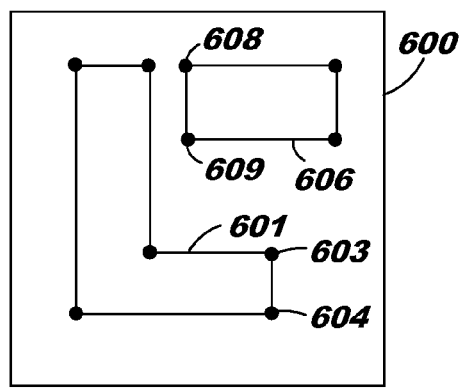
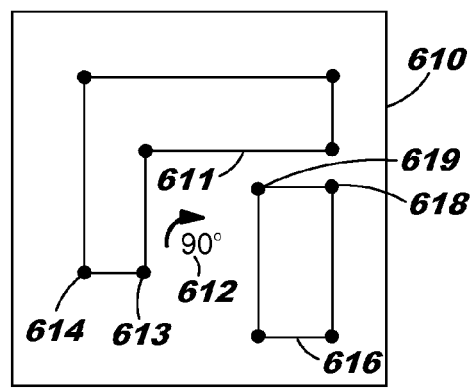
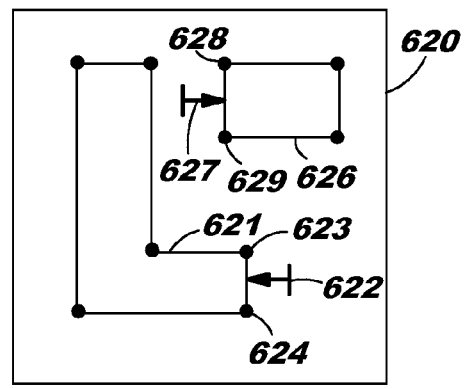
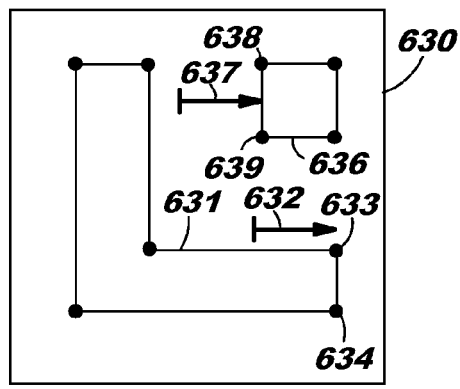

IDENTIFYING LAYOUT PATTERN CANDIDATES

BACKGROUND

1. Technical Field

The present invention relates generally to identifying layout pattern candidates, and in particular, to a computer implemented method for automatically identifying layout pattern candidates in selected regions for use in analyzing performance issues.

2. Description of Related Art

Some of the most complicated devices ever engineered by man are semiconductor integrated circuits. Some circuits such as microprocessors may include a billion transistors or more, and are getting more complicated in their design every year. In addition, the process of manufacturing these devices is getting more difficult and complicated as semiconductor manufacturing processes continue to develop the ability to manufacture smaller elements and more dense integrated circuits. This includes the use of photomasks that are denser and more complicated for patterning these smaller elements on semiconductor wafers.

As a result, testing throughout the design and manufacturing processes is necessary to be able to manufacture these semiconductor integrated circuits. This includes testing of circuit designs, testing of layout designs derived from the circuit designs, and testing of the resulting manufactured integrated circuits. Test results of manufactured products may be used to further analyze and possible modify the underlying circuit designs and layout designs.

SUMMARY

The illustrative embodiments provide a method, system, and computer usable program product for automatically identifying layout pattern candidates in selected regions for use in analyzing semiconductor device performance issues including identifying a set of target regions and a set of reference regions from a design layout; utilizing a processor to generate a reference baseline of layout patterns from the set of reference regions; utilizing the processor to compare a frequency profile of layout patterns in the set of target regions to a frequency profile of layout patterns in the reference baseline; and based on the comparison, utilizing the processor to identify candidate layout patterns from the set of target regions for further analysis.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 6 is a diagram of four different clips which may be compared to determine clustering in accordance with the preferred embodiment;

DETAILED DESCRIPTION

Processes and devices may be implemented and utilized for automatically identifying layout pattern candidates in selected regions for use in analyzing performance issues. These processes and apparatuses may be implemented and utilized as will be explained with reference to the various embodiments below.

Figure 1:
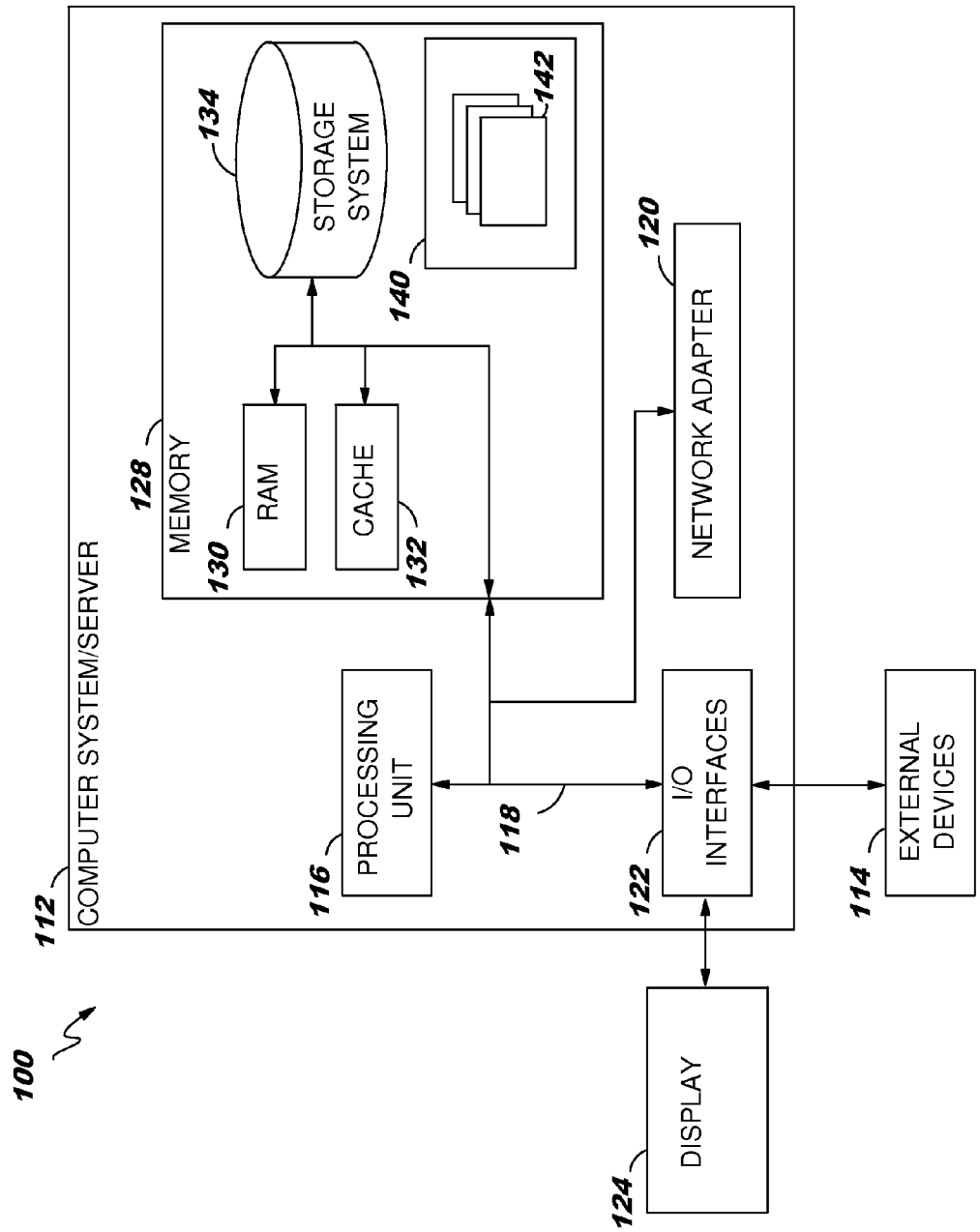
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as automatically identifying layout pattern candidates in selected regions for use in analyzing performance issues.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for automatically identifying layout pattern candidates in selected regions for use in analyzing performance issues.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
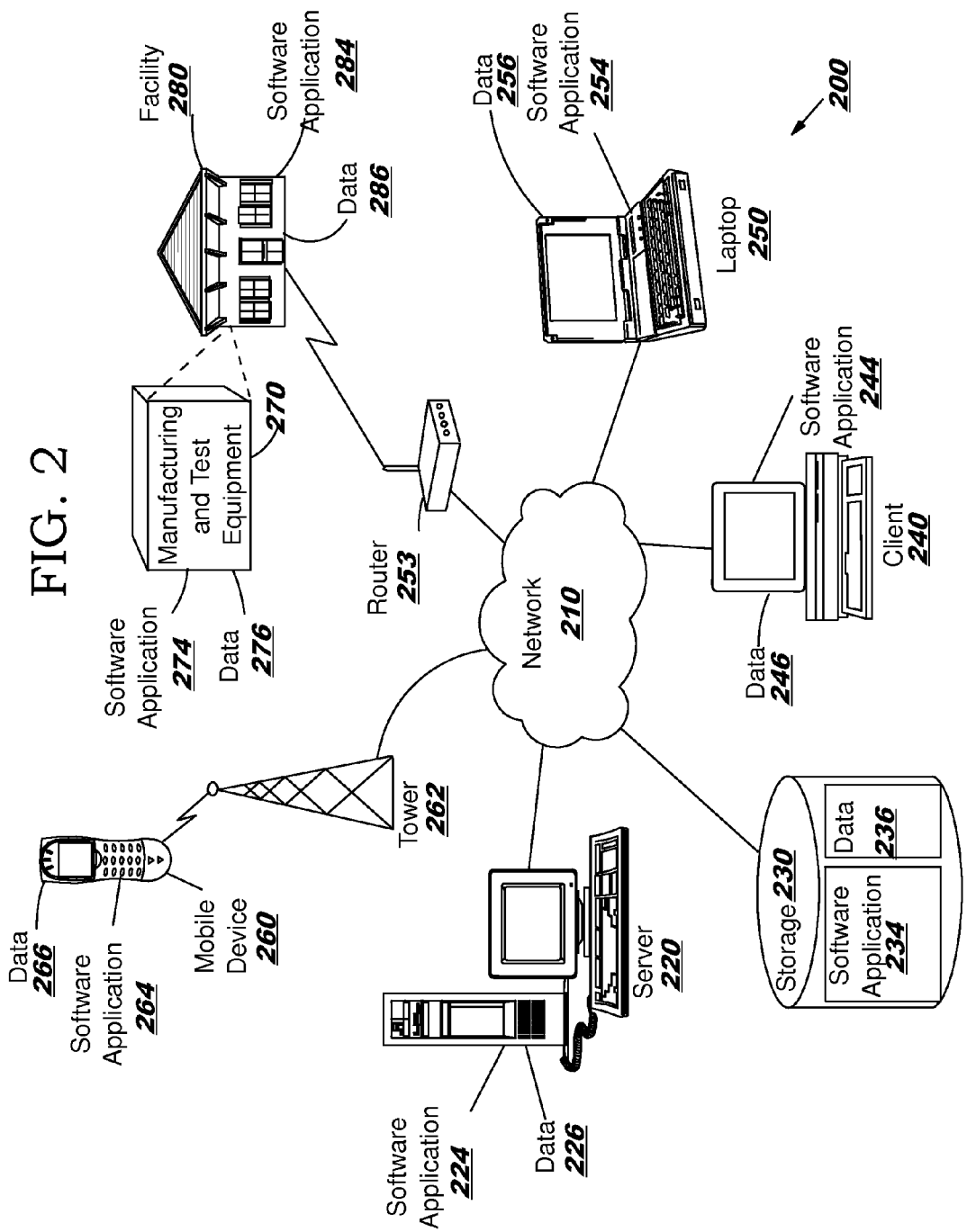
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for automatically identifying layout pattern candidates in selected regions for use in analyzing performance issues may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, manufacturing and test equipment 270, and facility 280 (such as a home or business) are coupled to network 210 including wirelessly such as through a network router 253. Facility 280 may be a semiconductor fabrication or test facility with manufacturing and test equipment 270 utilized for the production and/or testing of semiconductor devices. Facility 280 may also include other systems described herein such as server, computers, laptops, etc. A mobile phone 260 may be coupled to network 210 through a mobile phone tower 262. Data processing systems, such as server 220, client 240, laptop 250, mobile phone 260, manufacturing and test equipment 270, and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for automatically identifying layout pattern candidates in selected regions for use in analyzing performance issues or other software applications and data in accordance with embodiments described herein. Storage 230 may contain software application 234 and a content source such as data 236 for automatically identifying layout pattern candidates in selected regions for use in analyzing performance issues. Other software and content may be stored on storage 230 for sharing among various computer or other data processing devices. Client 240 may include software application 244 and data 246. Laptop 250 and mobile phone 260 may also include software applications 254 and 264 and data 256 and 266. Manufacturing and test equipment 270 may include software applications 274 and data 276. Facility 280 may include software applications 284 and data 286. Other types of data processing systems coupled to network 210 may also include software applications. Software applications could include a web browser, email, or other software application for automatically identifying layout pattern candidates in selected regions for use in analyzing performance issues.

Server 220, storage unit 230, client 240, laptop 250, mobile phone 260, manufacturing and test equipment 270, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, manufacturing and test equipment 270, and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
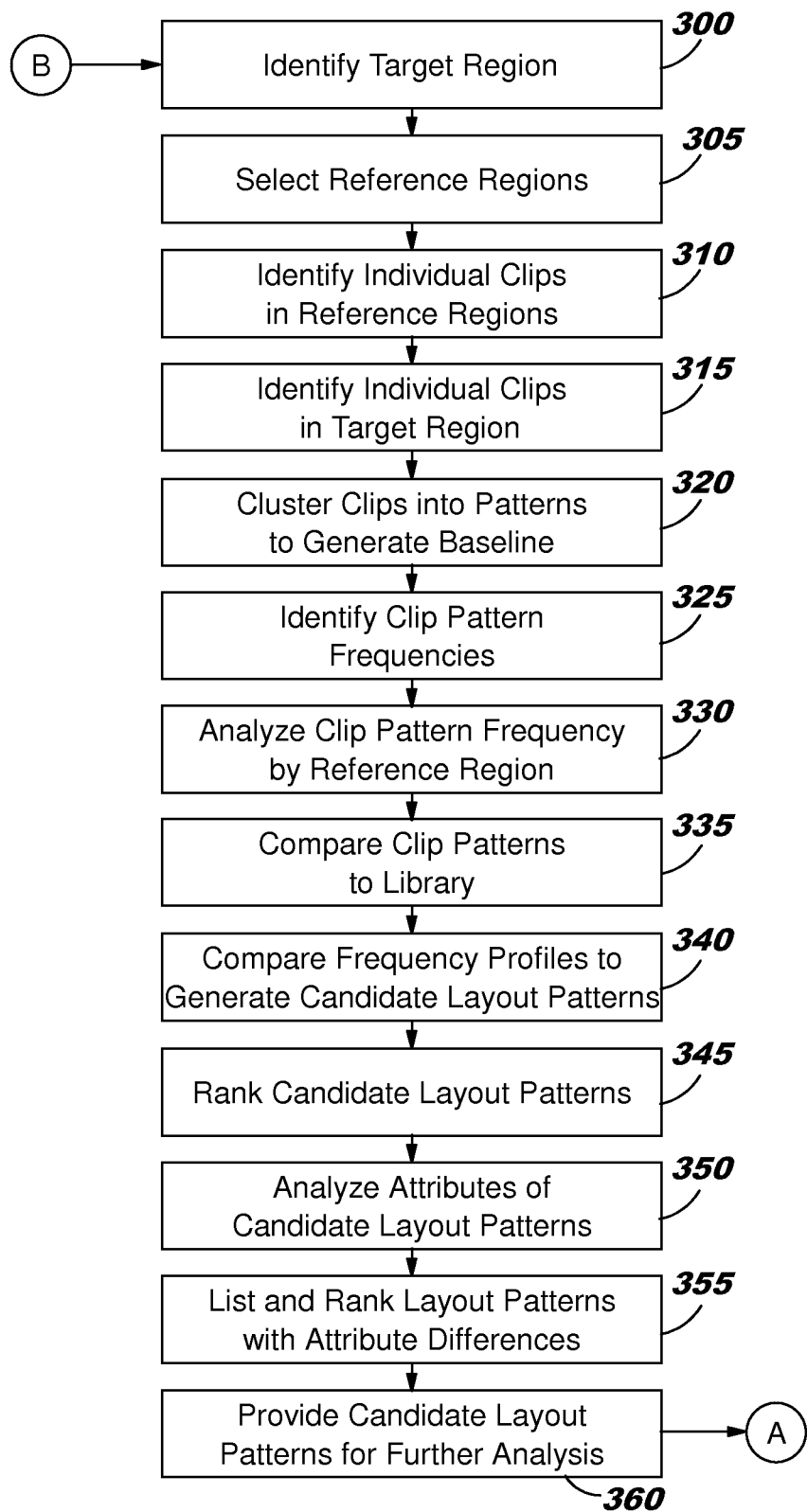
FIGS. 3A and 3B are flow diagrams of a process for identifying and utilizing layout pattern candidates in selected regions in accordance with a preferred embodiment.
Figure 3B:
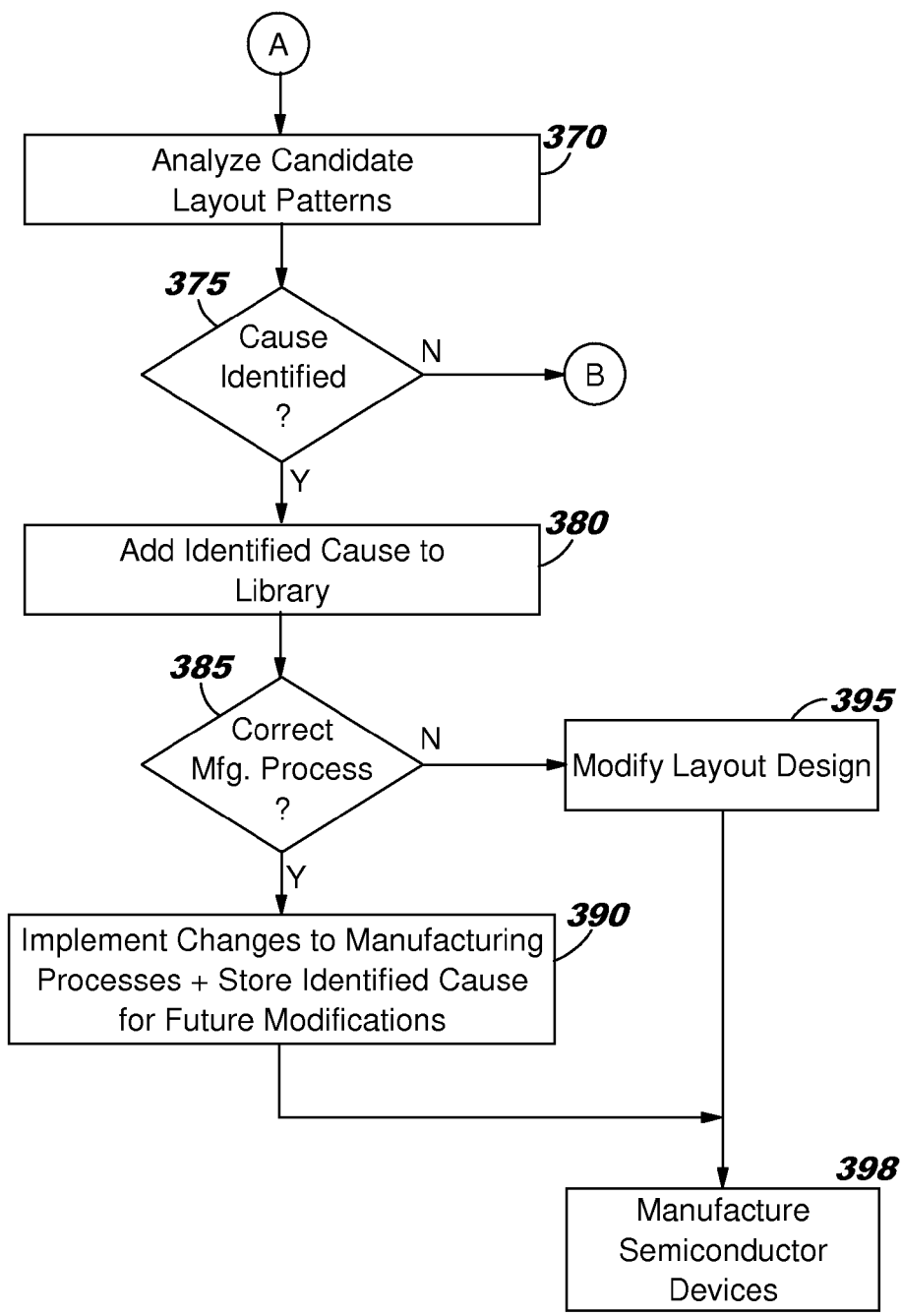

FIGS. 3A and 3B are flow diagrams of a process for identifying and utilizing layout pattern candidates in selected regions in accordance with a preferred embodiment. This process may be implemented utilizing the data processing systems described above with reference to FIGS. 1 and 2.

In this example, a manufactured semiconductor chip or a semiconductor chip layout design, collectively referred to herein as a semiconductor chip device, has been tested and various identified small regions have been determined from those tests to have performance issues, perhaps from manufacturing of those regions. The same principles can apply to a semiconductor manufacturing photomask or a semiconductor photomask layout design, referred to herein as a semiconductor photomask device. A semiconductor chip device and a semiconductor photomask device are collectively referred to as a semiconductor device herein. Testing can include physical testing of semiconductor chips or photomasks as well as simulation testing of layout designs of those chips and photomasks. In the case of semiconductor chips devices, these performance issues can include failures, reliability issues, and/or poor performance relative to what was expected. In the case of semiconductor photomask device issues, these performance issues can include premature photomask failure or degradation, or performance issues in semiconductor devices manufactured using the photomasks. It is these identified target (selected) regions of circuitry layout design which can be analyzed using this process to determine candidate layout patterns for further analysis and possible correction. This process is for finding possible correlations between layout patterns and reported performance issues to explain the difference in performance between two groups of regions. That is, certain shapes or combinations of shapes (layout patterns) represent features that can be difficult to manufacture.

In the below described example, this analysis is directed to the underlying integrated circuit layout design utilized to generate photomasks that are then used to manufacture the semiconductor chip. This analysis is intended to identify candidate layout patterns that may be causing performance issues so that corrective actions can be taken to correct the performance issues.

In a first step 300, a target region of the integrated circuit is identified for evaluation, generally based on poor test results. This can be accomplished by a variety of techniques. A common method for identifying a target region for analysis is to electrically sense the inputs and outputs of the semiconductor device and/or points within the semiconductor device and determine whether the outputs are as expected based on a set of test inputs. This type of electrical testing can be performed using a device under test tool or other types of tools known to those of ordinary skill in the art. Additional analysis of the electrical test results including statistical analysis can be utilized to further narrow the area of interest to a small target region (or regions) of interest for analysis as described below. This analysis can include using electrical test results of the semiconductor chip followed by statistical analysis of the results utilizing the underlying circuit design. This region of interest for analysis is referred to herein as a target region. The target region can be limited to certain target parameters including layers of the layout design and even certain types of materials (e.g., polymers) within a layer or layers. Although this process is described with reference to a single target region, multiple target regions can be similarly processed, preferably concurrently or possibly sequentially.

Alternatively, the semiconductor chip can be viewed thermally and hot or cool spots can be identified as potential failure or poor performing regions. For example, a cool spot may show circuits in a region performing much more slowly than expected such as due to a non-performing circuit. For another example, a hot spot may show circuits in a region having difficulty performing expected operations due to a short or other circuit problem. Other types of testing may be utilized to identify a region of circuitry which may be failing or performing more poorly than expected or desired. This step can also be utilized to generate multiple regions of integrated circuitry for evaluation.

In a second step 305, multiple regions of the underlying integrated circuit layout design are selected for analysis using the same parameters as the target region (e.g., layers of the layout design, certain types of materials, etc.) to generate a reference baseline. These regions are referred to herein as reference regions. The reference baseline is a representative sample of the design and will include a set of identified and catalogued layout patterns with frequency information derived from the reference regions. The resulting reference baseline is useful for comparison with the target region as described below.

Several techniques may be utilized to select the reference regions to generate a representative reference baseline of the integrated circuit layout design within the target parameters described above (e.g., layer and material type). For example, many individual cells or nets within the integrated circuit layout design may be randomly selected, each selected cell or net acting as a reference region. Alternatively, individual or groups of cells or nets may be selected for analysis to develop the baseline based on prior or current diagnostics of the semiconductor device. In another alternative, a number of large regions, each region with many cells or nets, may be randomly selected and utilized as reference regions. Certain regions such as the target regions may be avoided in this reference region selection process. The number of reference regions selected for analysis can vary depending on the size of each region, the amount of time and resources available to analyze multiple regions, and the need for generating statistically significant results. An analysis of the whole integrated circuit layout design (i.e. 100 percent sampling) may be performed to generate a complete reference baseline.

Other areas of interest besides cell or nets are the location of a potential bridge between two metal lines, the location of an MRC (Mask Rule Check) violation, which could also be the area between two shapes (i.e. line spacing violation), etc. Although the below is described mostly with references to cells and nets, it can also apply to other patterns within layout designs.

Then in step 310, each cell or net within the reference regions is analyzed to identify individual clips such as shown with reference to FIG. 4 below. A clip is typically a standard size area within a cell or net that contains a unique collection of vertices, also known as points or pixels. That is, a clip contains one or more objects or portions of objects, each object defined by a set of vertices. An object may be a metal segment, a circuit element, etc. Clips can be overlapping to the extent that each overlapping clip contains a different set of vertices. Clips are preferably about three to six (n) pitches or line widths in length and width, although alternative embodiments may include larger or smaller clips. Clips are preferably square to allow easier checking for rotated or flipped clip variations. To generate unique sets of vertices, each clip should typically overlap any adjoining clips by n−1 or less pitches or line widths in either the x or y direction. As a result, an individual vertex may be included in up to n squared different clips or more depending on the circumstances. A cell or net can easily include hundreds of individual clips depending on the complexity and size of the cell or net. Each identified clip is stored in a clip database with a list of the vertices contained in each clip. Each identified clip is also stored with a unique clip identifier as well as identifiers of the reference region and cell, and the location of the clip within the cell.

In addition to identifying and storing each clip, a set of attributes is identified for each clip and stored with the clip (or linked to each clip for easy reference). These attributes can include factors that could possibly affect performance in some circumstances. For example, the proximity of objects in the clip to other adjoining objects in the layer, the overall general density of the surrounding environment, the proximity of other objects above or below the objects in the clip, density of underlying layers, available timing slack for nets, etc. In addition, the originating reference region for each clip is stored as an attribute for that clip.

This process is repeated for each cell or net within the reference regions, thereby generating a large compilation of clips, each clip with a set of attributes. The number of clips can perhaps number in the tens of thousands or more depending on the size and number of the reference regions. Once all the reference regions are analyzed to identify the large compilation of clips, processing then continues to step 315.

Steps 305 and 310 may be skipped if a reference baseline has already been generated using the selected reference regions with the same parameters (e.g., layers of the layout design, certain types of materials, etc.). If new additional reference regions are desired, such as to improve the statistical significance of results, then step 305 may still be performed to select new additional reference regions to be analyzed and used to supplement the reference baseline.

In step 315, each cell or net within the target region is also analyzed to identify individual clips such as shown with reference to FIGS. 4 and 5 below and described with reference to step 310 above. Each identified clip is stored in the clip database with a list of the vertices contained in each clip. Each identified clip is also stored with a unique clip identifier as well as identifiers of the target region and cell, and the location of the clip within the cell. Clips of the reference regions and the target region(s) in the clip database can easily be distinguished based on the stored region identifiers.

In addition to identifying and storing each clip, a set of attributes is identified for each clip and stored with the clip (or linked to each clip for easy reference) in the clip database. These attributes can include factors that could possibly affect performance in some circumstances. For example, the proximity of objects in the clip to other adjoining objects in the layer, the overall general density of the surrounding environment, the proximity of other objects above or below the objects in the clip, density of underlying layers, available slack, etc.

This process is repeated for each cell or net within the target region, thereby generating a compilation of target clips for storage in the clip database, each clip with a set of attributes. Once the target region is fully analyzed thereby identifying all the unique clips contained therein, processing then continues to step 320.

In step 320, the identified clips in the clip database are then clustered and cataloged into similar clip patterns (also referred to herein as a layout pattern) without regard to whether the clips originate from a reference regions or a target region. That is, each clip contains objects or portions of objects defined by sets of vertices. Those clips that are significantly similar are clustered together as a clip pattern. This process includes identifying and grouping together clips that are similar yet rotated and/or flipped such as described below with reference to FIG. 5. That is, rotated or flipped clips should generally behave similarly, hence the grouping. The determination that a clip may be rotated or flipped can be added as an attribute for that clip. The process for clustering clips into clip patterns is described in greater detail below with reference to FIGS. 6 through 9 below.

This clustering process can distill the number of clips by a factor of 100 or more. For example, 10,000 clips may be clustered and catalogued into approximately 100 clip patterns, some clip patterns with 500 or more similar clips, some with just a few clips. However, the individual attributes for each clip within each clip pattern may be retained for possible further analysis as described below.

This catalogue of clustered clip patterns is referred to herein as a baseline. The catalogue of clustered clip patterns from reference regions is referred to herein as a reference baseline. This baseline provides a useful set of clip patterns useful for comparison between the reference regions and the target region as described below.

In an alternative embodiment, the reference regions clips may be stored in a separate clip database from the target clips. In addition, the reference regions clip patterns may be stored in a separate reference baseline from the target region clip patterns.

If the clustering process of step 320 had been performed previously with a prior set of reference and/or target regions using the same parameters (e.g., layers of the layout design, certain types of materials, etc.), then this step may be performed differently. That is, the addition of new reference or target regions may be used to supplement the catalogue of clustered clip patterns rather than to rebuild the catalogue from scratch.

Then in step 325, frequencies for each clip pattern in the baseline are identified. That is, the number of clips from all reference regions are counted for each clip pattern and the number of clips from the target region are also counted for each clip pattern. Once all clip patterns are counted, then a frequency of each clip pattern (e.g. percentage) can be generated for the reference regions and for the target region, resulting in two separate sets of frequencies in the baseline for easy comparison.

Then in an optional step 330, each clip pattern in the reference baseline is also analyzed for frequency by reference region. That is, each clip within a clip pattern (layout pattern) is counted for each originating reference region. As noted above the reference region for a clip is stored as an attribute for that clip. This generates an average number of each clip pattern by reference region including a standard deviation or other measure of dispersion, thereby resulting in a frequency profile. For example, a particular layout pattern XYZ may have an average frequency of 30 instances in each reference region with a standard deviation of 5. This type of information is particularly useful if the reference regions are generally about the same size, especially if the target region is also about the same size. Otherwise, the value of this statistical information may diminish is there are large variations in region size, although some weighting of data may provide statistically useful information. This statistical information can be utilized as described below.

In another optional step 335, the identified clip patterns in the baseline may be compared to a library of known problem layout patterns. That is, the identified clip patterns may include clip patterns known to have performance issues. Such identified clip patterns may be provided as candidate layout patterns for additional analysis even if they are not located in a target region.

Now that a baseline has been generated, processing now proceeds to analyzing the target region or regions in step 340. In step 340, the frequency profile of the clip patterns in the target region is compared to the frequency profile of the clip patterns from reference regions in the reference baseline. That is, the percentage of clips for each pattern found in the target region is compared to the percentage of clips found for each pattern in the reference baseline. For example, XYZ clip pattern may include 9 percent of the clips in the target region, but only 3 percent of the clips in the reference baseline are from reference regions. As a result, clip pattern XYZ may be utilized three times more frequently in the target region than in the reference baseline. As a result, clip pattern XYZ may be a candidate for additional analysis. From this frequency profile analysis, a set of candidate clip patterns are identified as having a greater use in the target region than in the reference baseline. Since these candidate clip patterns are used with more frequency in the target region, it is possible that they may be a cause of performance issues in the target region.

The identified candidate clip patterns (layout patterns) are then ranked in step 345. This ranking may be based on statistical significance and overall frequency. This is to assist in managing resources for analyzing the candidate layout patterns. It is possible that those layout patterns with a statistically significant higher frequency than the reference baseline (much greater frequency of use than normal) may be a source of performance issues. Also, those in greater numbers may also have a greater significant likelihood of affecting performance. If step 330 was performed above, the standard deviation for each clip pattern can be utilized to determine statistical significance in ranking the results.

Other factors may also be utilized in ranking the candidate layout patterns such as layout pattern complexity. That is, a more complex layout pattern may be more likely to be the source of performance issues. Other resources may also be utilized. For example, certain candidate layout patterns in the target region may be in the library of known problem layout patterns as identified above in step 335. This may be particularly true for layout patterns that have a zero frequency in the reference baseline. As a result, layout patterns found in the library of known problem layout patterns should be more highly ranked. In addition, certain layout patterns may have been studied in detail previously and determined to not be the cause of performance issues. As a result, those known good patterns may be lower ranked or eliminated from consideration.

In step 350, higher ranked candidate layout patterns can be further analyzed based on their attributes. That is, a candidate clip pattern may have clips with a higher frequency of certain attributes than the clips in the same clip pattern in the reference baseline. For example, candidate XYZ clip pattern may have a high frequency of clips in a certain orientation than the clips in the corresponding XYZ clip pattern in the reference baseline. This analysis includes looking at the distribution of attributes within each higher candidate clip pattern (layout pattern) in comparison to the corresponding reference baseline clip pattern attribute distribution. Any large differences can be identified through this type of analysis. Child clip patterns (a subset of a clip pattern in the baseline derived utilizing clip attribute information) may even be generated in the baseline based on this attribute information.

Although resources may be allocated to the higher ranked candidate layout patterns, all candidate layout patterns may be similarly analyzed if the resources are available. In addition, even non-candidate target layout patterns may be similarly analyzed in searching for significant differences between the target region and the reference baseline. For example, ABC clip pattern may occur in the same frequency in the target region and reference baseline, but certain attributes may occur with much greater frequency in the target region. In that case, the ABC clip pattern with the attribute distribution differences may be a useful candidate for further analysis.

In step 355, any large differences in attribute distribution for certain layout patterns are listed and ranked as candidate layout patterns for further analysis. These candidate layout patterns with attribute distribution differences may be added to the current list of candidate layout patterns or they may be provided as a separate set of candidate layout patterns.

Then in step 360, the ranked candidate layout patterns including any candidate layout pattern attribute differences are provided for further analysis.

Up to this point in the process, all steps in this process may be performed automatically based on preselected parameters. Human intervention may be useful under certain circumstances, but the automation of this process allows for quicker results with less human bias in the process.

Then in step 370, the provided candidate layout patterns may be further analyzed utilizing a variety of techniques known to those of ordinary skill in the art. This analysis is to help determine which of the candidate layout patterns is/are causing the performance issues. This can include the use of a variety of performance and failure analysis such as additional electrical testing of the semiconductor device, additional statistical analysis of prior and/or new test results, the use of forensic techniques on the semiconductor chip such as by imaging, and other techniques utilized by those of ordinary skill in the art.

In step 375, the results of the analysis are received and appropriate action taken. If no candidate layout patterns have been identified as causing the performance issues, then additional target regions may be identified and analyzed for identifying new candidate layout patterns in steps 305-365 above. If candidate layout patterns are identified as causing the performance issues, then those patterns are added to the library of known problem layout patterns in step 380 followed by proceeding to step 385.

Then in step 385, it is determined whether the manufacturing processes can be modified to correct the performance issues caused by the identified candidate layout patterns without requiring a change in mask sets utilized to manufacture the semiconductor device. This can include changing certain annealing temperatures, modifying exposure times, and quite a variety of other modification known to those ordinary skill in the art. If yes, then those manufacturing changes are implemented in step 390. In addition, in step 390 the identified candidate layout patterns are stored for use later in updating the mask set should there be other updates to the mask set in the future. Processing then continues from step 390 to step 398 where the semiconductor device is manufactured utilizing the modifications of step 390.

If no in step 385, then in step 395 the semiconductor chip layout design is modified to correct the layout pattern issues. New mask sets and additional manufacturing changes may be implemented as part of this process. Processing then continues from step 395 to step 398 where the semiconductor device is manufactured utilizing the modifications of step 395.

Figure 4:
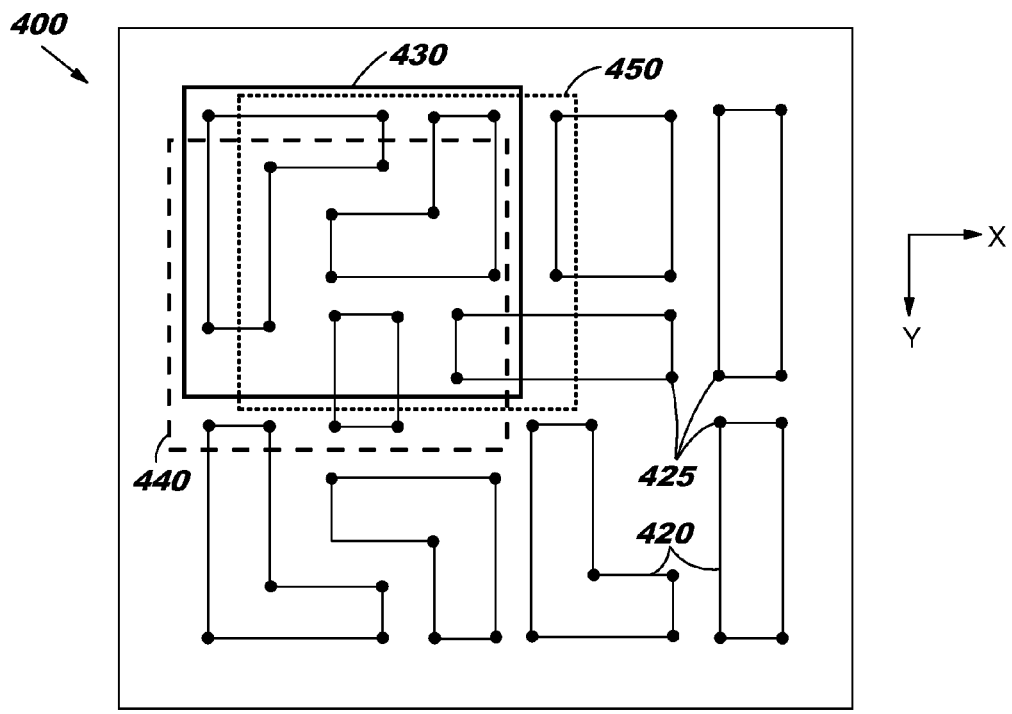
FIG. 4 is a diagram of a cell with multiple overlapping clips in accordance with the preferred embodiment.

FIG. 4 is a diagram of a cell 400 with multiple overlapping clips in accordance with the preferred embodiment. Cell 400 includes multiple objects 420, each object defined by vertices 425. A first clip 430 of cell 400 is shown with a solid boundary. First clip 430 is located in the upper northwest corner of cell 400 within cell 400. Clip 430 includes all or portions of certain object including a set or subset of vertices for each object. In this example, clip 430 is approximately one-half the width and height of the cell, although cells can commonly be much larger. In addition, clip 430 is approximately 5 times the width and height of a line width (minimum object width or height).

A second clip 440 is shown in a dashed line in the downward y direction from first clip 430. A slight offset in the x direction is also shown for illustrative purposes only. Second clip 440 has the same dimensions (width and height) as first clip 430. As shown, second clip 440 does not include certain vertices contained within first clip 430. Second clip 440 also contains some vertices not included in first clip 430. As a result, second clip 440 is different from first clip 430 based on the different set of vertices contained in each clip. Often an adjacent overlapping clip will include new vertices or drop certain vertices, not both. That both occur in this example is due to the distance between the new and dropped vertices is the same as the height of the clip boundaries.

A third clip 450 is shown in a dotted line in the rightward x direction from first clip 430. A slight offset in the y direction is also shown for illustrative purposes only. Third clip 450 has the same dimensions (width and height) as first clip 430 and second clip 440. As shown, third clip 450 does not include certain vertices contained within first clip 430 or second clip 440. Third clip 450 also contains some vertices not included in first clip 430 or second clip 440. As a result, third clip 450 is different from first clip 430 and second clip 440 based on the different set of vertices contained in each clip. Often an adjacent overlapping clip will include new vertices or drop certain vertices, not both. That both occur in this example is due to the distance between the new and dropped vertices is the same as the width of the clip boundaries.

Additional overlapping clips may be utilized in the x direction, the y direction and combinations thereof. Each clip should contain a unique set of vertices from any other clip.

Figure 5:
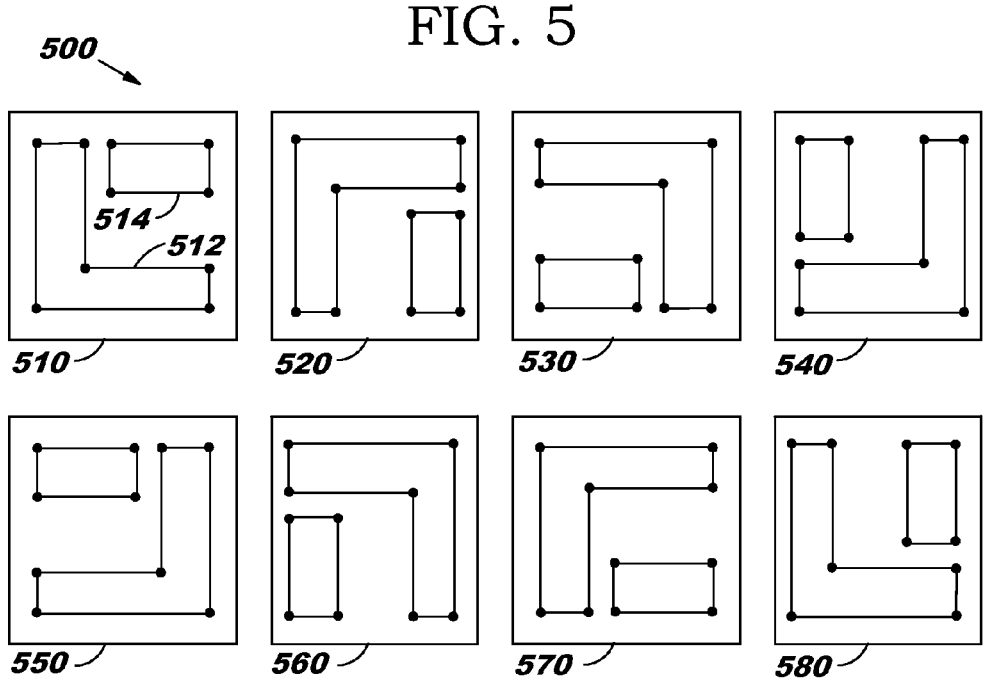
FIG. 5 is a diagram of eight different variations of a clip in accordance with the preferred embodiment.

FIG. 5 is a diagram of eight different variations of a clip 500 in accordance with the preferred embodiment. A first clip 510 is shown with objects 512 and 514. Clip 510 may be rotated to clockwise by 90, 180 and 270 degrees to generate clip variations 520, 530 and 540. Clip 510 may also be flipped (mirrored) in one direction to generate clip variation 550 (or in the other direction to generate clip variation 570). Clip variation 550 can then be rotated counterclockwise by 90, 180 and 270 degrees to generate clip variations 560, 570 and 580.

As described above with reference to FIG. 3, all eight variations of a clip may be clustered or otherwise grouped into a common clip pattern. However, the variation may be stored as an attribute of each clip for further analysis.

FIG. 6 is a diagram of four different clips which may be compared to determine clustering in accordance with the preferred embodiment. Each of these clips includes ten vertices. In the preferred embodiment, only clips with the same number of vertices are compared for clustering. The interconnections between vertices are ignored for clustering purposes in accordance with the preferred embodiment. However, the outlines of each object are shown in FIG. 6 for illustrative purposes.

A first clip 600 includes ten vertices from two objects, 601 and 606. Four vertices 603, 604, 608 and 609 are identified for illustrating the differences between clips. The other six vertices are used in the below described process, but are in identical relative positions in each clip, so they are not identified in this illustrated example.

A second clip 610 also includes ten vertices from two objects, 611 and 616. All vertices including vertices 613, 614, 618 and 619 are in identical relative positions with clip 600, except that the clip has been rotated 90 degrees clockwise 612. As a result, clips 600 and 610 would be considered essentially perfect matches except for the rotation and should be clustered into the same clip pattern.

A third clip 620 also includes ten vertices from two objects 621 and 626. All vertices are in identical relative positions with clip 600 except for vertices 623, 624, 628 and 629. The differences are shown with indicators 622 and 627.

A fourth clip also includes ten vertices from two objects 631 and 636. All vertices are in identical relative positions with first clip 600 except for vertices 633, 634, 638 and 639. The differences are shown with indicators 632 and 637.

Vertices 623, 624, 628 and 629 of third clip 620 are closer to the comparable vertices of first clip 600 than vertices 633, 634, 638 and 639 of fourth clip 630. This can be seen by the relative lengths of indicators 622 and 627 compared to the lengths of indicators 632 and 637. As a result, third clip 620 is a closer match to first clip 600 (and second clip 610) than fourth clip 630.

Some variation between clips is allowable in the preferred embodiment. Similar clips should have similar behaviors, so an exact match is not required. In order to allow for some variation, a matching score can be generated automatically which can then be used for matching clips for clustering if the score exceeds a predetermined threshold score.

Although clips are shown with reference to cells, cell instances or regions in FIGS. 4, 5 and 6 above, clips may also be utilized by one of ordinary skill in the art for nets and metal segments in semiconductor chip devices as well as for other patterns in layout designs such as in in semiconductor photomask devices, the location of a potential bridge between two metal lines, the location of an MRC (Mask Rule Check) violation, which could also be the area between two shapes (i.e. line spacing violation). Such clips for nets and metal segments and other layout design patterns can also be similarly processed as described herein by one of ordinary skill in the art.

Figure 7:
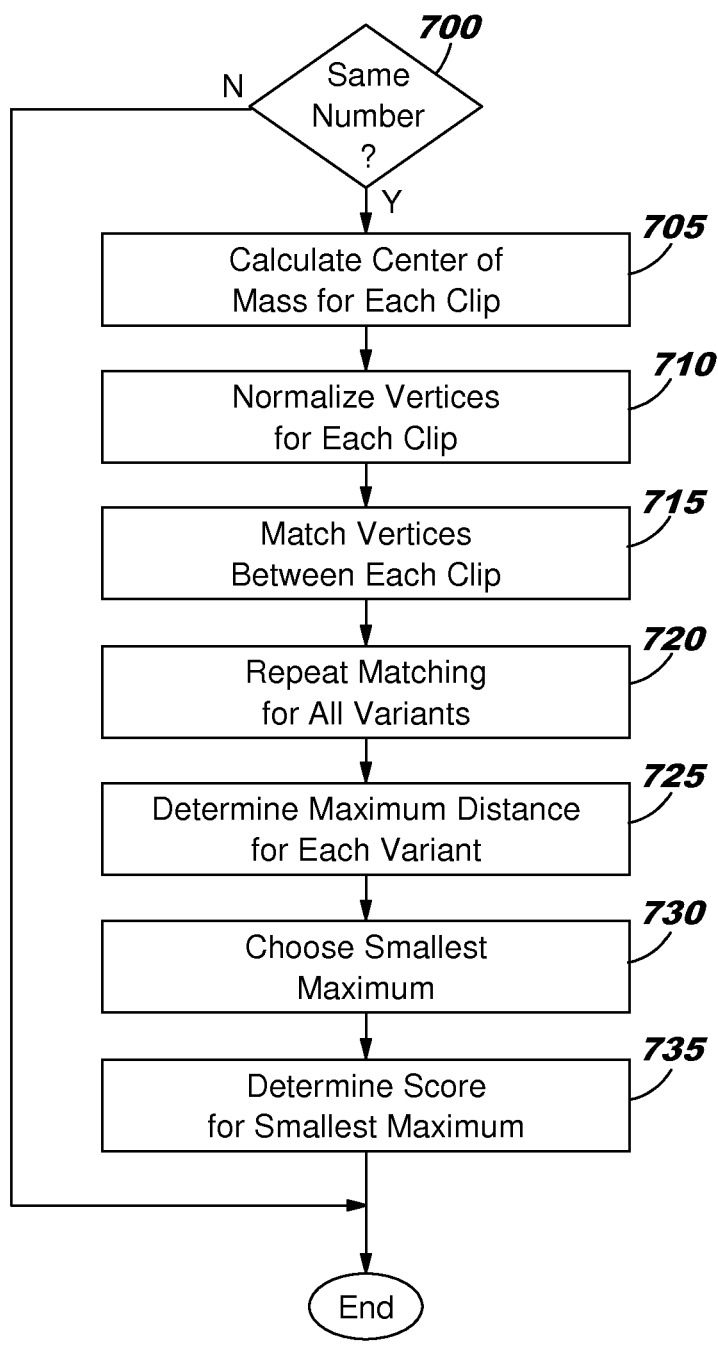
FIG. 7 is a flow diagram of a process used for generating clip match scores between any two clips in accordance with the preferred embodiment.

FIG. 7 is a flow diagram of a process used for generating clip match scores between any two clips in accordance with the preferred embodiment. In this example, there are a clip A and a clip B, each with 10 vertices, each vertex having x and y coordinates (e.g. (xi, yi) where i=1 to 10 for the vertices of clip A and (xj, yj) where j=1 to 10 for the vertices of clip B). The x and y coordinates may have a common or different point of origin in this example.

In a first step 700, it is determined whether the clip A and clip B contain the same number of vertices. If not, then processing ceases, otherwise it continues to step 705. In step 705, a center of mass is calculated for each clip. The x coordinate for the center of mass of all vertices in a clip can be calculated by summing all the x coordinates for the vertices of that clip and dividing the sum by the number of vertices. For example, for a clip with ten vertices Xc=(x1+x2+ . . . +x10)/10 where Xc is the x coordinate of the center of mass. Similarly, the y coordinate for the center of mass of all vertices in a clip can be calculated by summing all the y coordinates for the vertices of that clip and dividing the sum by the number of vertices. For example, for a clip with ten vertices Yc=(y1+y2+ . . . +y10)/10 where Yc is the y coordinate of the center of mass. This is the center of mass for all the vertices in the clip regardless whether the vertices are from one, two or more objects.

The calculated center of mass (Xc, Yc) is then used in step 710 to normalize the x and y coordinates of each vertex within the clip. This is accomplished by subtracting the center of mass coordinates from each vertex coordinate. For example, for a first vertex of a clip with coordinate (x1, y1), the normalized coordinate is ((x1-Xc), (y1-Yc)). As a result, each vertex coordinate for a clip now has a point of origin at the center of mass of the vertices for that clip.

In step 715, the normalized vertices of clip A are then matched to the normalized vertices of clip B based on proximity in step 715. In the preferred embodiment, the normalized vertices of each clip are compared and the closest vertices are matched based on distance between vertices. That is, a first normalized vertex of clip A is matched with the closest normalized vertex of clip B. The second normalized vertex of clip A is then matched with the closest normalized vertex of clip B. If the first and second normalized vertices of clip A match the same normalized vertex of clip B, then the closest vertex of clip A gets the match and the second closest vertex must be matched with the next closest normalized vertex of clip B. This process continues until all the normalized vertices of clip A are matched with normalized vertices of clip B. In the preferred embodiment, the distance between normalized vertices calculated based on the formula D((xi,yi),(xj, yj))=max(|xi-xj|,|yi-yj|). For example, if a normalized vertex in clip A is at (1,1) and two vertices of clip B are at (3,3) and (2,5), the closest clip B vertex to the clip A vertex is (3,3) based on D=2. That is, D=max(|1-3|,|1-3|)=max(2,2)=2 versus D=max(|1-2|,|1-5|)=max (1,4)=4.

Alternative embodiments may utilize alternative matching schemes and alternative distance formulas for matching vertices between clips. For example, the distance between vertices may be based on the Pythagorean formula and the matching based on a lowest average distance between matched sets of vertices. However, such alternative techniques to match vertices may require significantly more calculations to implement than the preferred embodiment described above.

Then in step 720, the process of step 715 is repeated with the other 7 variants of clip B (i.e., rotated and flipped). A simple transformation of the vertices of clip B can be performed to enable this matching. That is, each vertex of clip B (Xi, Yi) can be transformed as (-Xi, Yi), (Xi, -Yi), and (-Xi, -Yi) for rotations. Each vertex can be flipped by reversing the coordinates to (Yi, Xi) and then further transformed to (-Yi, Xi), (Yi, -Xi), and (-Yi, -Xi) for rotations of the flipped vertices.

Once the normalized vertices in all eight clip variations of clip B have been matched to the normalized vertices of clip A in steps 715 and 720, then the maximum distance {max D(n) where n=1, 2, . . . 8} for each clip variant match of normalized vertices is determined in step 725. That is, for the first variation calculated in step 715 above, the matching pair of vertices with the greatest distance may be Dmax=2. All the other matching pairs of vertices for that variation of clip B may be closer together than Dmax=2. The same process applies to the other seven variations of clip B calculated in step 320. In the preferred embodiment, the distances are calculated using the same formula described above with reference to step 715 above.

Then in step 730, the clip B variation with the smallest Dmax (smallest maximum distance) is chosen as the best matching variation with clip A. That is, the smallest maximum distance Dmin=min(Dmax(n) where n=1, 2, . . . 8) between the matched vertices of clip A and the eight variations of the matched vertices of clip B is identified as the best match. As a result, if a pattern of normalized vertices in clip A are closest to a particular variation of a pattern of normalized vertices in clip B, then that is the variation of clip B that clip A most resembles. Alternative embodiments may utilize other types of distance measures and variant selection in steps 725 and 730, such as using a smallest average Pythagorean distance between matched vertices for a given variant of clip B.

Finally, a score of this smallest maximum distance is calculated for clustering clips. This score is derived by dividing the smallest maximum score Dmin by the size of the clip, subtract that from 1 and multiple that by 100 (e.g., score=(1-(Dmin/clip size))*100). The result is a score from 0 to 100 where 0 is no match and 100 is a perfect match.

Figure 8:
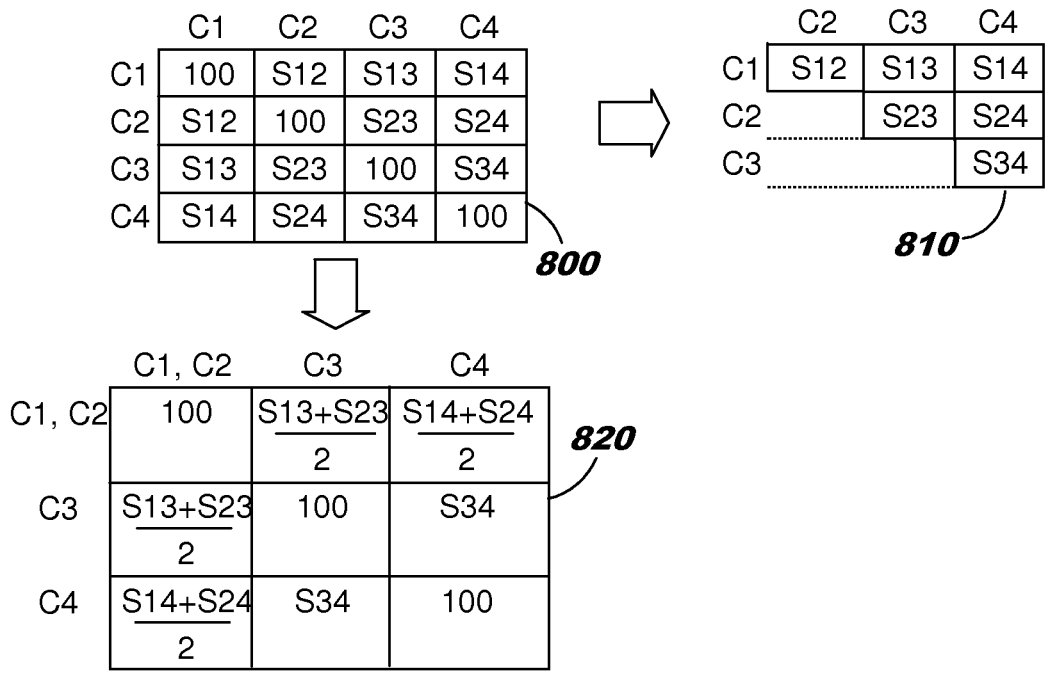
FIG. 8 is a diagram of a matrix utilized to cluster clips into clip patterns in accordance with the preferred embodiment.

FIG. 8 is a diagram of a matrix utilized to cluster clips into clip patterns in accordance with the preferred embodiment. In this matrix, all clips with the same number of vertices are matched with each other as described above with reference to FIGS. 6 and 7 above. Each cell of the matrix includes the score resulting from that matching process.

As shown in FIG. 8, there are four clips with the same number of vertices in this example. They are clips C1, C2, C3 and C4. The matching scores for each pair of clips are shown in the cells with S13 representing the matching score between clip C1 and clip C3. Please note that clip C1 is a perfect match with itself. Please also note that the matrix includes duplicates where the score for matching clip C1 with clip C2 is the same score as matching clip C2 with clip C1. As a result, the number of unique scores for making decisions on combining clips is much less than shown in matrix 800. Matrix 810 shows the unique scores from matching clips. As a result, even if a matrix 800 is utilized for clustering clips, the number of clip matching can be reduced significantly to (n-1)*(n-2) where n is equal to the number of clips to be combined.

Once a pair of clips is clustered, then the columns and rows for those clips are combined and weightings averaged as shown in matrix 820. For illustrative purposes, clips C1 and C2 of matrix 800 are combined in this example. As a result, the columns and rows for C1 and C2 are combined as shown in matrix 820. Furthermore, any scores involving either clip 1 or clip 2 with other clips are then averaged using a weighted average. For example, the score for clip 3 matching with the combination of clip 1 and clip 2 is (S13+S23)/2.

The decision to cluster clips is based on the matching scores and whether they exceed a threshold. The threshold may be set to 80 or 90 for example, depending on the degree of similarity desired. The process for deciding when to combine clips in accordance with this threshold is described below with reference to FIG. 9.

Figure 9:
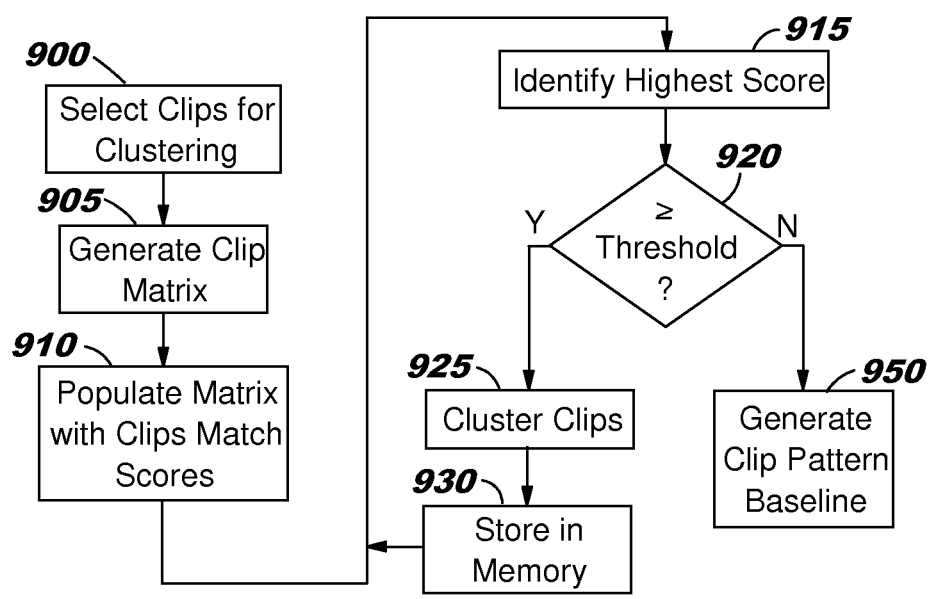
FIG. 9 is a flow diagram of a process used for clustering clips into clips patterns in accordance with the preferred embodiment.

FIG. 9 is a flow diagram of a process used for clustering clips into clips patterns in accordance with the preferred embodiment. In a first step 900, a set of clips with the same number of vertices are selected for clustering. Preferably this includes all clips generated using the above processes with the same number of vertices. In a second step 905, a matrix is generated as described above with reference to FIG. 8. In a third step 910, each of the clips is matched with the other clips to generate a score as described above with reference to FIGS. 6 and 7 and the match scores are used to fill in the cells of the matrix as shown above with reference to FIG. 8.

Once the matrix is completed, then the process of clustering clips begins. In step 915, the best clip match is identified. That is, the clip match with the highest score is identified, not including where a clip is matched with itself. That score is then compared to the threshold in step 920. If the score is less than the threshold, then the clustering process is completed and processing continues to step 950. Is the score is greater than or equal to the threshold, then in step 925 the rows and columns of matched clips with the selected highest score are clustered including calculating a weighted average of the scores for any combined cells such as shown in FIG. 8 above. In step 930, the clustering of clips is retained (e.g., stored in memory) for use as described below in step 950. Processing then returns to step 915.

In step 950, the clustering in completed, so every remaining row (or column) of the matrix is considered a clip pattern also known as a layout pattern. This includes clips that were not combined with any other clips. A catalogue of clip patterns called the baseline is then generated from the clip database using the stored information from step 930. Each clip pattern record of the baseline can include information about the clips contained in that clip pattern including links to the underlying clips in the clip database. The clip pattern clustering process is then completed at this point, although additional processing such as creating child clip patterns can be performed such as described in FIGS. 3A-3B above.

Figure 10:
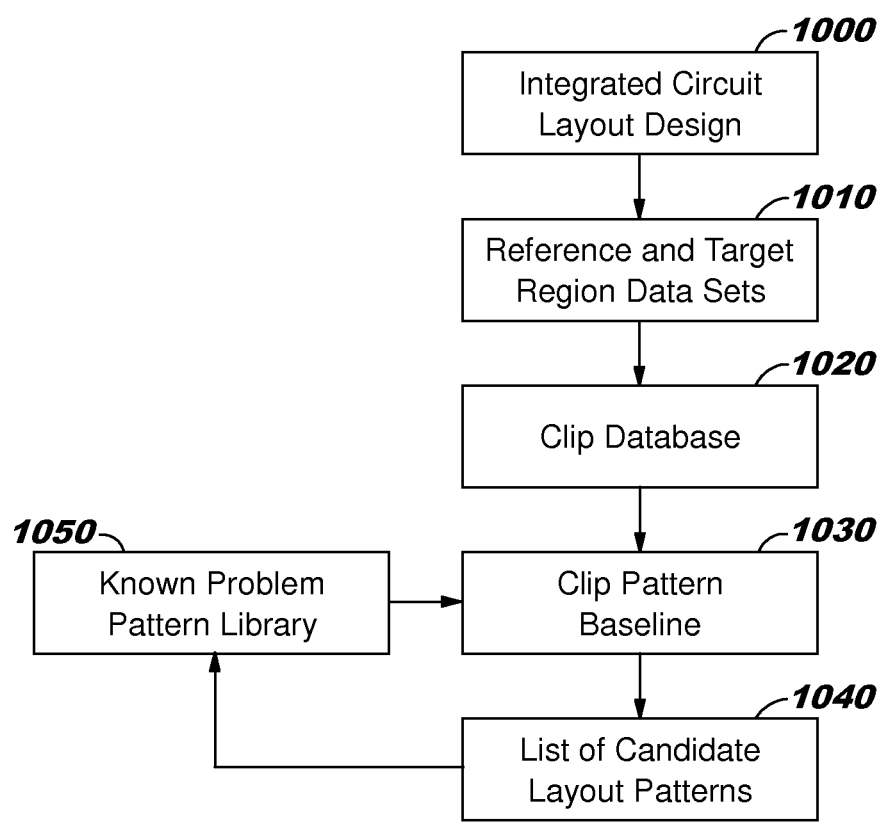
FIG. 10 is a diagram of various databases used throughout the process for identifying and utilizing layout pattern candidates in accordance with the preferred embodiment.

FIG. 10 is a diagram of various databases used throughout the process for identifying and utilizing layout pattern candidates in accordance with the preferred embodiment. Each of these databases may be stored and utilized in different servers, in the cloud, or locally such as shown in FIGS. 1 and 2 above, depending on the implementation.

A circuit design layout design 1000 is used to generate a set of reference and target region data sets 1010. Circuit design layout design 1000 can be one of many types of similar databases utilized for generating photomask sets for use in manufacturing semiconductor devices. A circuit design layout design is typically produced from a circuit design using standard libraries of cells and nets that are useful with certain semiconductor manufacturing processes. Once test results of semiconductor devices are received indicating possible problems with certain target regions, then the target regions and a set of reference regions are derived from circuit design layout pattern 1000 to generate the reference and target region data sets 1010. These data sets are within certain parameters such as a particular layer and type of material.

A clip database 1020 of unique clips is generated from the reference and target region data sets as described above. Similar clips in clip database 1020 are then clustered into a clip pattern baseline 1030. This clip pattern baseline can then be compared to a known problem pattern library as well as analyzed based on frequency profile analysis to identify a list of candidate layout patterns 1040 for further testing and analysis. If any of the candidate patterns are found to be problematical, then the known problem pattern library may be updated accordingly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for automatically identifying layout pattern candidates in selected regions for use in analyzing performance issues. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automatically identifying layout pattern candidates in selected regions for use in analyzing semiconductor device performance issues comprising:
    identifying a set of target regions and a set of reference regions from a design layout;
    identifying individual clips in the set of reference regions and the set of target regions;
    clustering the individual clips by layout pattern similarity to generate a reference baseline of layout patterns from the set of reference regions including determining a first frequency of reference layout patterns in the set of reference regions;
    clustering the individual clips by layout pattern similarity from the set of target regions to determine a second frequency of target layout patterns in the set of target regions;
    comparing the second frequency of target layout patterns in the set of target regions to the first frequency of reference layout patterns in the reference baseline;
    based on the comparison, identifying candidate layout patterns from the set of target regions for further analysis;
    determining whether any of the candidate clip patterns caused a performance issue in the target region; and
    upon a positive determination, correcting the candidate layout pattern to correct the performance issue.

2. The method of claim 1 wherein the reference baseline is derived from clips of the set of reference regions.

3. The method of claim 2 wherein each clip contains a unique set of vertices from the set of reference regions.

4. The method of claim 3 wherein the clips are clustered into layout patterns.

5. The method of claim 4 wherein clips are clustered if their layout pattern similarity exceeds a predetermined threshold.

6. The method of claim 5 wherein the layout pattern similarity between two clips is determined based on a proximity of matched normalized vertices between the two clips.

7. The method of claim 6 further comprising utilizing the processor to generate a baseline of layout patterns from the set of target regions and the set of reference regions; wherein the reference baseline is derived from the baseline; and wherein the set of target regions and the set of reference regions are selected from the layout design based on a preselected layer and a preselected material.

8. The method of claim 1 wherein clustering the individual clips by pattern similarity to generate the reference baseline of layout patterns includes utilizing layout patterns from the set of target regions to generate the reference baseline.

9. The method of claim 1 wherein the set of target regions and the set of reference regions are selected from the layout design based on a preselected layer and a preselected material.

10. A computer program product for automatically identifying layout pattern candidates in selected regions for use in analyzing semiconductor device performance issues, the computer program product comprising a computer readable storage medium having program instructions embodied therewith, the program instructions executable by a processing circuit to cause the device to perform a method comprising:
    identifying a set of target regions and a set of reference regions from a design layout;
    identifying individual clips in the set of reference regions and the set of target regions;
    clustering the individual clips by layout pattern similarity to generate a reference baseline of layout patterns from the set of reference regions including determining a first frequency of reference layout patterns in the set of reference regions;
    clustering the individual clips by layout pattern similarity from the set of target regions to determine a second frequency of target layout patterns in the set of target regions;
    comparing the second frequency of target layout patterns in the set of target regions to the first frequency of reference layout patterns in the reference baseline;
    based on the comparison, identifying candidate layout patterns from the set of target regions for further analysis;
    determining whether any of the candidate layout patterns caused a performance issue in the target region; and
    upon a positive determination, correcting the candidate layout pattern to correct the performance issue.

11. The computer program product of claim 10 wherein the reference baseline is derived from clips of the set of reference regions.

12. The computer program product of claim 11 wherein each clip contains a unique set of vertices from the set of reference regions.

13. The computer program product of claim 12 wherein the clips are clustered into layout patterns.

14. The computer program product of claim 13 wherein clips are clustered if their layout pattern similarity exceeds a predetermined threshold.

15. The computer program product of claim 14 wherein the layout pattern similarity between two clips is determined based on a proximity of matched normalized vertices between the two clips.

16. The computer program product of claim 15 wherein clustering the individual clips by pattern similarity to generate the reference baseline of layout patterns includes utilizing layout patterns from the set of target regions to generate the reference baseline.

17. The computer program product of claim 16 wherein the set of target regions and the set of reference regions are selected from the layout design based on a preselected layer and a preselected material.

18. A data processing system for automatically identifying layout pattern candidates in selected regions for use in analyzing semiconductor device performance issues, the data processing system comprising:
    a processor; and
    a memory storing program instructions which when executed by the processor execute the steps of:
        identifying a set of target regions and a set of reference regions from a design layout;
        identifying individual clips in the set of reference regions and the set of target regions;
        utilizing the processor to cluster the individual clips by layout pattern similarity to generate a reference baseline of layout patterns from the set of reference regions including determining a first frequency of reference layout patterns in the set of reference regions;
        clustering the individual clips by layout pattern similarity from the set of target regions to determine a second frequency of target layout patterns in the set of target regions;

utilizing the processor to compare the second frequency of target layout patterns in the set of target regions to a the first frequency of reference layout patterns in the reference baseline;

based on the comparison, utilizing the processor to identify candidate layout patterns from the set of target regions for further analysis;

determining whether any of the candidate layout patterns caused a performance issue in the target region; and upon a positive determination, correcting the candidate layout pattern to correct the performance issue.

19. The data processing system of claim 18 wherein the reference baseline is derived from clips of the set of reference regions.

20. The data processing system of claim 19 wherein each clip contains a unique set of vertices from the set of reference regions.

21. The data processing system of claim 20 wherein the clips are clustered into layout patterns.

22. The data processing system of claim 21 wherein clips are clustered if their layout pattern similarity exceeds a predetermined threshold.

23. The data processing system of claim 22 wherein the layout pattern similarity between two clips is determined based on a proximity of matched normalized vertices between the two clips.

24. The data processing system of claim 18 wherein clustering the individual clips by pattern similarity to generate the reference baseline of layout patterns includes utilizing layout patterns from the set of target regions to generate the reference baseline.

25. The data processing system of claim 18 wherein the set of target regions and the set of reference regions are selected from the layout design based on a preselected layer and a preselected material.

26. A method of automatically identifying layout pattern candidates in selected regions for use in analyzing semiconductor device performance issues comprising:

upon receipt of a design layout, identifying a set of target regions and a set of reference regions from the design layout;

identifying individual clips in the set of reference regions and the set of target regions;

clustering the individual clips by layout pattern similarity to generate a reference baseline of layout patterns from the set of reference regions including determining a first frequency of reference layout patterns in the set of reference regions;

clustering the individual clips by layout pattern similarity from the set of target regions to determine a second frequency of target layout patterns in the set of target regions;

comparing the second frequency of target layout patterns in the set of target regions to the first frequency of reference layout patterns in the reference baseline; and based on the comparison, identifying candidate layout patterns from the set of target regions for further analysis;

determining whether any of the candidate layout patterns caused a performance issue in the target region; and upon a positive determination, correcting the candidate layout pattern to correct the performance issue.

* * * * *